United States Patent [19]
Ross

[11] Patent Number: 5,455,593
[45] Date of Patent: Oct. 3, 1995

[54] EFFICIENTLY DECREASING THE BANDWIDTH AND INCREASING THE RADIATED ENERGY OF AN UWB RADAR OR DATA LINK TRANSMISSION

[75] Inventor: Gerald F. Ross, Longboat Key, Fla.

[73] Assignee: Anro Engineering, Inc., Lexington, Mass.

[21] Appl. No.: 276,469

[22] Filed: Jul. 18, 1994

[51] Int. Cl.⁶ ..................................................... H01Q 3/22
[52] U.S. Cl. .............................. 342/375; 42/368; 42/82; 455/103
[58] Field of Search ....................... 342/375, 368, 342/202, 82, 173, 174, 379; 343/103; 455/103

[56] References Cited

U.S. PATENT DOCUMENTS

| | | | |
|---|---|---|---|
| 4,138,678 | 2/1979 | Kirner | 343/17.7 |
| 4,234,940 | 11/1980 | Iinuma | 367/105 |
| 4,359,779 | 11/1982 | Levine | 455/10 |
| 4,743,906 | 5/1988 | Fullerton | 342/27 |
| 5,084,706 | 1/1992 | Ross et al. | 342/368 |
| 5,239,309 | 8/1993 | Tang et al. | 342/13 |

Primary Examiner—Thomas H. Tarcza
Assistant Examiner—Dao L. Phan
Attorney, Agent, or Firm—George Grayson

[57] ABSTRACT

An Ultra-Wideband (UWB) transmitter array consists of N individual transmitters coupled to a reference cw oscillator. Each of the N transmitters generates a waveform consisting of a number of cycles of a nominal carrier frequency of $f_o$. The duration of the amplitude spectrum of the envelope of each signal is T. The transmitters are arranged in close proximity to form a multipole moment and are precisely synchronized to each other and delayed appropriately so that the resulting amplitude spectrum of the envelope of the transmitter array is due to a pulse duration of NT seconds. This reduces the overall signal bandwidth by a factor of N, at the same time increasing the radiated energy by a factor of N.

14 Claims, 9 Drawing Sheets

EFFICIENTLY DECREASING THE BANDWIDTH AND INCREASING THE RADIATED ENERGY OF AN UWB RADAR OR DATA LINK TRANSMISSION

REFERENCED PATENTS (1) U.S. Pat. No. 3,739,392; issued Jun. 12, 1973, entitled, "Baseband Radiation and Reception System", by Gerald F. Ross and Kenneth W. Robbins.

(2) U.S. Pat. No. 3,983,422; issued Sep. 28, 1976, entitled, "A Detector Having a Constant False Alarm Rate", by A. M. Nicolson and Richard M. Mara.

(3) U.S. Pat. No. 3,728,632; issued Apr. 17, 1973, entitled, "Short Baseband Pulse Communications System", by Gerald F. Ross.

(4) U.S. Pat. No. 5,084,706; issued Jan. 28, 1992, entitled, "Synchronization of Very Short Pulse Microwave Signals for Array Applications", by Gerald F. Ross and Richard M. Mara.

(5) U.S. Pat. No. 5,216,695; issued Jun. 1, 1993, entitled, "Short Pulse Microwave Source with High PRF and Low Power Drain", by Gerald F. Ross, Richard M. Mara, and Kenneth W. Robbins.

RELATED APPLICATION (1) U.S. patent application Ser. No. 07/885,300; filed May 18, 1992, entitled, "Coherent Processing Tunnel Diode UWB Receiver", by Gerald F. Ross.

BACKGROUND OF THE INVENTION

1. Scope of the Invention

This invention relates principally to Ultra-Wideband radar or data link transmission, and more specifically to the technique for reducing the bandwidth and increasing the radiated energy of these signals by using an array of low-cost transmitters.

2. Description of the Prior Art

The use of Ultra-Wideband (UWB) transmissions in both radar and data communications has been developed both for military and commercial applications. UWB radar systems consist of replacing the conventional pulse modulated or swept cw transmitter with a baseband or impulse-like source which excites a UWB antenna cavity, as shown in G. F. Ross, K. Robbins, "Baseband Radiation and Reception System", U.S. Pat. No. 3,739,392. The antenna radiates, essentially, its impulse response which consists of a transient signal of several RF cycles; the nominal center frequency of this short pulse burst of radiation is determined by the dimensions of the antenna cavity. The signal reflects off a target and returns to a similarly designed receiving antenna where it can be processed by a tunnel diode constant false alarm rate (CFAR) receiver similar to A. M. Nicolson, R. Mara, "A Detector Having a Constant False Alarm Rate", U.S. Pat. No. 3,983,422. In the process of reflecting off a target, the signal is further dispersed by the scattering properties of the target. In the communications mode, the signal does not have the benefit of a synchronizing cable between the transmitter and receiver and different schemes must be developed to "lock" the received signal to the source clock. For reference, see G. F. Ross, "Short Baseband Pulse Communications System", U.S. Pat. No. 3,728,632. Here, the range of the system is much greater because of only one-way transmission. And the signal is not dispersed by the target.

These systems transmit very short duration signals, for example, nanosecond or subnanosecond durations. For this reason, very little energy is radiated. Although this radiation for systems having a peak power of 1 kw or less is not likely to interfere with narrowband receivers, these systems do spread their available spectral energy over a very wide band (hence the UWB) and can place energy in restricted FCC bands. These signals, however, are, generally, substantially below kTB-NF for any given receiving channel, where: k is Boltzmans constant; T, the temperature; B, the bandwidth; and NF, the noise figure.

Because of FCC regulations, it may be necessary to reduce the bandwidth of a UWB transmission so that its spectral energy does not extend beyond assigned limits. An inefficient method to reduce the bandwidth of a radiated UWB signal is to "disperse" the pulse by using a narrow-band antenna. For example, instead of a transmission bandwidth BW, the bandwidth may be reduced to bw by the selection of an appropriate antenna. Now, the total energy radiated is reduced directly by the ratio $$\frac{bw}{BW}.$$

Consider the pulse modulated sinusoidal signal shown in FIG. 3a. It follows from linear system theory that, in the time domain, the waveform still resonates at $f_o$, but the signal becomes more dispersive and the amplitude decreases. The duration of the signal increases directly as $$\frac{BW}{bw}$$

while the voltage amplitude of the signal decreases as $$\frac{bw}{BW}.$$

Thus, the energy $E_2$ in the new transmission is decreased by:

$$E_2 = v_2^2 \cdot \tau_2 \propto \left(\frac{bw}{BW}\right)^2 \cdot \frac{BW}{bw} = \frac{bw}{BW}$$

i.e., by the direct reduction of the bandwidth. This follows from Parseval's theorem, which states that all the given energy in the time domain is spread over the entire frequency band. Mathematically, this is given as:

$$\int_0^T f^2(t)dt = \frac{1}{2\pi} \int_{-\infty}^{+\infty} |F(\omega)|^2 d\omega$$

where $$f(t) \leftrightarrow F(\omega)$$

are Fourier transforms. The important observation to make here is that the amplitude of the radiated signal has decreased directly by the required bandwidth reduction. One may be required to reduce signal bandwidth further to meet certain FCC band limitations; the result of reduced signal bandwidth is the reception of a much smaller and dispersive signal for a given input energy level. The pulse modulated signal shown in FIG. 3a, f(t) and its Fourier transform, F(ω), are given by:

phase with the reference oscillator cw signal. The output signals are always contiguous in time and in synchronization with each other at the far field.

$$f(t) = \sin \omega_o t [U(t) - U(t-T)], \quad f \underset{\leftrightarrows}{} F(\omega) = \frac{\sin(\omega - \omega_o)\frac{T}{2}}{(\omega - \omega_o)} + \frac{\sin(\omega + \omega_o)\frac{T}{2}}{(\omega + \omega_o)}.$$

F(ω) is shown in FIG. 3b. The envelope function [U(t)–U(t–T)] and its spectrum are shown in FIG. 3b.

As first indicated, the approach of narrowing the bandwidth of a UWB transmission to attempt to accommodate FCC regulation, as described above, is inefficient. Generally, one attempts, via UWB technology, to generate a large video or impulsive-like waveform in the most economical manner, excite an antenna cavity, and radiate the resulting pulse with minimum distortion. A time differentiation, due to the radiation properties of the antenna, is a necessary degree of distortion (dispersion) that follows from Maxwell's equations. The one or two additional cycles in the radiated waveform due to antenna distortion can be minimized by resistive loading (e.g., a further energy loss) or by using more optimum antennas (e.g., certain wire antennas, TEM mode waveguide horns, etc.). The use of a TEM mode horn antenna minimizes distortion, but the net energy radiated at any given angle is less; that is, the energy is radiated over much wider angles.

Accordingly, it is an object of the invention to provide a technique to decrease the required bandwidth for FCC purposes while achieving higher radiated energy and, at the same time, taking full advantage of the low-cost techniques inherent in the generation of UWB signals by impulsing antenna cavities. These two objectives may apppear contradictory. However, while the economical approach of generating RF signals by impulse excitation of antennas was developed for UWB systems, it is also applicable to narrowband, high-energy transmissions, as will be shown below.

SUMMARY OF THE INVENTION

The above objects and advantages are achieved in a preferred embodiment of the present invention. According to the preferred embodiment, an Ultra-Wideband (UWB) transmitter array consists of N individual transmitters coupled to a reference cw oscillator. Each of the N transmitters generates a waveform consisting of a number of cycles of a nominal carrier frequency of $f_0$. The duration of the amplitude spectrum of the envelope of each signal is T. The transmitters are arranged in close proximity to form a multipole moment and are precisely synchronized to each other and delayed appropriately so that the resulting amplitude spectrum of the envelope of the transmitter array is due to a pulse duration of NT seconds. This reduces the overall signal bandwidth by a factor of N, at the same time increasing the radiated energy by a factor of N.

Each of the N transmitters includes an avalanche transistor Marx Generator which is coupled to the reference cw oscillator through a divide-down network. Each transmitter, in conjunction with its antenna, radiates a short signal of a number of cycles. A mixer in each transmitter compares the radiated pulse with the oscillator cw signal and generates a null or ±signal to indicate any phase discrepancy. A peak detector responds to this signal to keep the radiated signal in

DESCRIPTION OF THE DRAWINGS

FIG. 3b shows the amplitude spectrum of the signal of FIG. 3a.

FIG. 6b shows the amplitude spectrum of the pulses of FIG. 6a.

FIG. 7b shows the amplitude spectrum of the pulses of FIG. 7a.

DESCRIPTION OF THE PREFERRED EMBODIMENT

Figure 1:
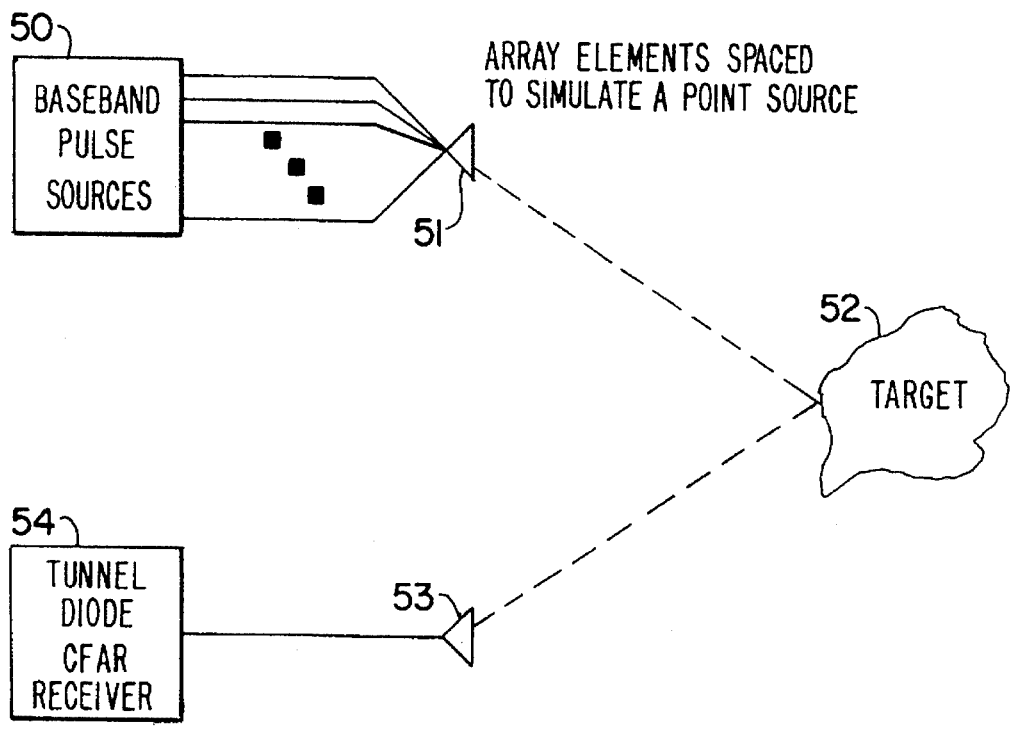
FIG. 1 is a block diagram of a UWB radar configuration which uses the invention.

FIG. 1 shows a typical UWB radar configuration. Included are a baseboard pulse source 50 for generating a radar signal, a UWB antenna 51 made up of N radiating elements in close proximity for radiating the signal, a target 52, an antenna 53, and a tunnel diode CFAR receiver 54 for receiving the signal reflected from the target 52.

Figure 2:
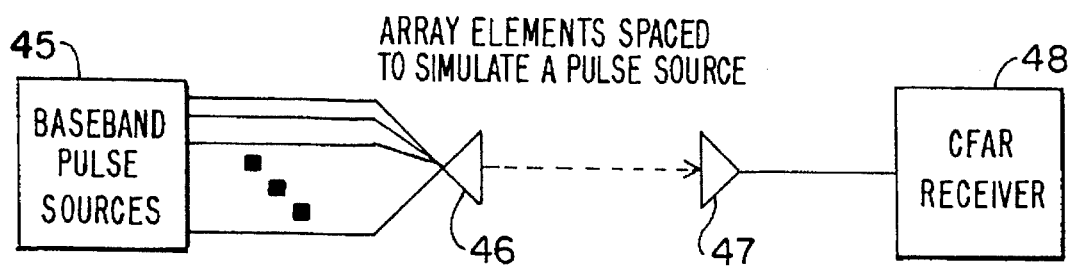
FIG. 2 is a block diagram of a UWB data transmission link which uses the invention.

FIG. 2 shows a typical UWB data transmission link. Included are a baseband data pulse source 45, a UWB antenna cavity 46 made up of N radiating elements in close proximity for radiating a data signal, a receive antenna 47, and a CFAR receiver 48.

Figure 3A:
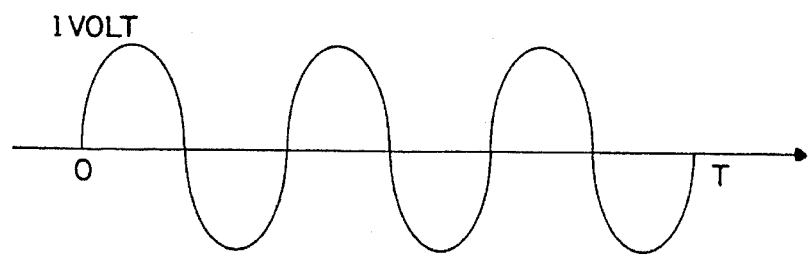
FIG. 3a shows a voltage vs. time graph of a UWB pulse modulated microwave signal.
Figure 3B:
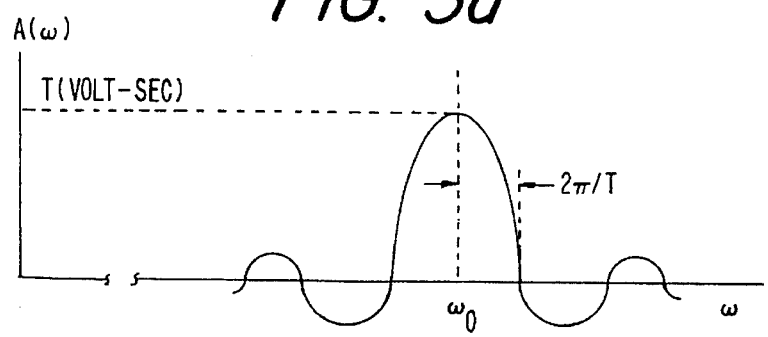
Figure 4A:
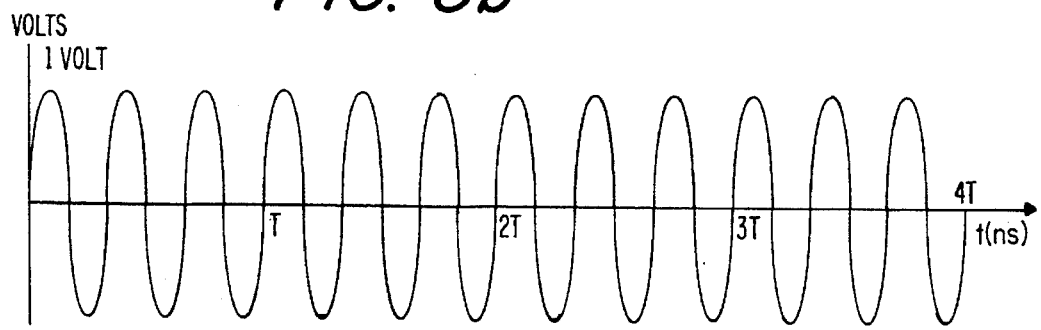
FIG. 4a shows a voltage vs. time graph of a signal produced by the synchronization of four UWB microwave sources contiguous in time.
Figure 4B:
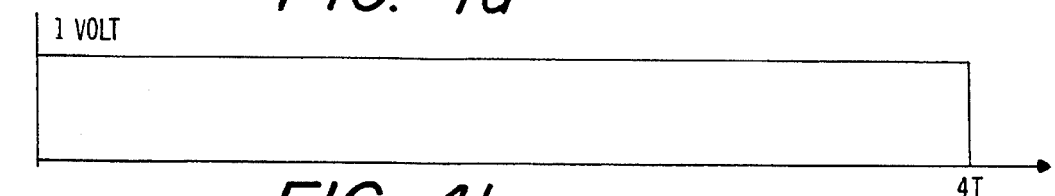
FIG. 4b shows the time domain envelope function for the four contiguous UWB signals.
Figure 4C:
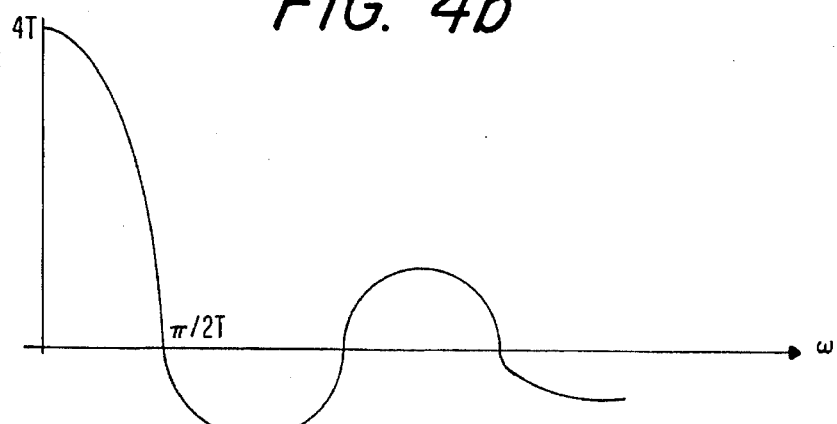
FIG. 4c shows the amplitude spectrum of the envelope function of FIGS. 4a and 4b.

The generation of the decreased bandwidth and increased amplitude radar and data signals is described as follows. Consider the ideal pulse modulated waveform shown in FIG. 3a. The waveform consists of three cycles of a nominal carrier frequency of $f_o$. Let's assume that this waveform is generated by impulse exciting an antenna cavity. The duration of the signal is T. The amplitude spectrum of the envelope of the signal is shown in FIG. 3b. Now, let's form a quadrupole moment of sources delayed appropriately so they are contiguous in time as shown in FIG. 4a. Each source is precisely synchronized, possibly in accordance with the technique shown in U.S. Pat. No. 5,084,706 entitled "Synchronization of Very Short Pulse Microwave Signals for Array Applications" by G. F. Ross and R. M. Mara. In this manner, the duration of the envelope of the new transmitted waveform is 4T as pictured in FIG. 4b, reducing the overall signal bandwidth by a factor of four as shown in FIG. 4c while retaining the same spectrum shape as shown in FIG. 3b. At the same time we have, using this technique, increased the radiated energy by a factor of 4. In general, by placing N elements in close proximity forming a multipole moment, we can reduce the bandwidth and increase the energy of a radiated signal directly by an arbitrary factor of N. The minimum spacing is determined by mutual coupling constraints.

Figure 5A:
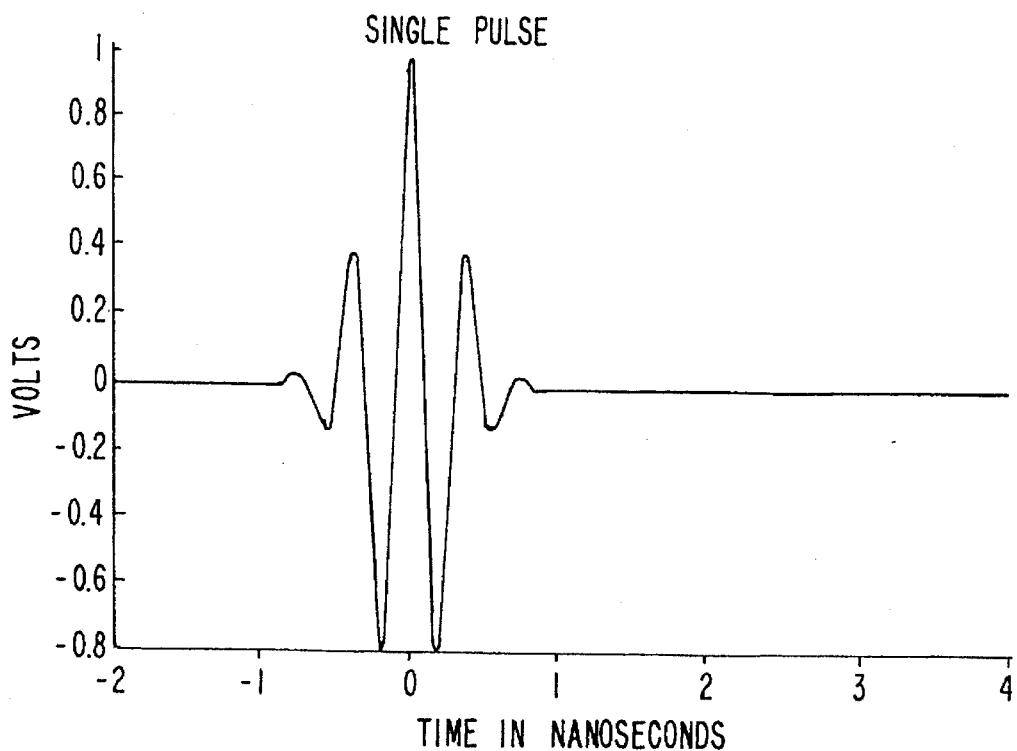
FIG. 5a shows the Gaussian-like radiated response of the single pulse.
Figure 5B:
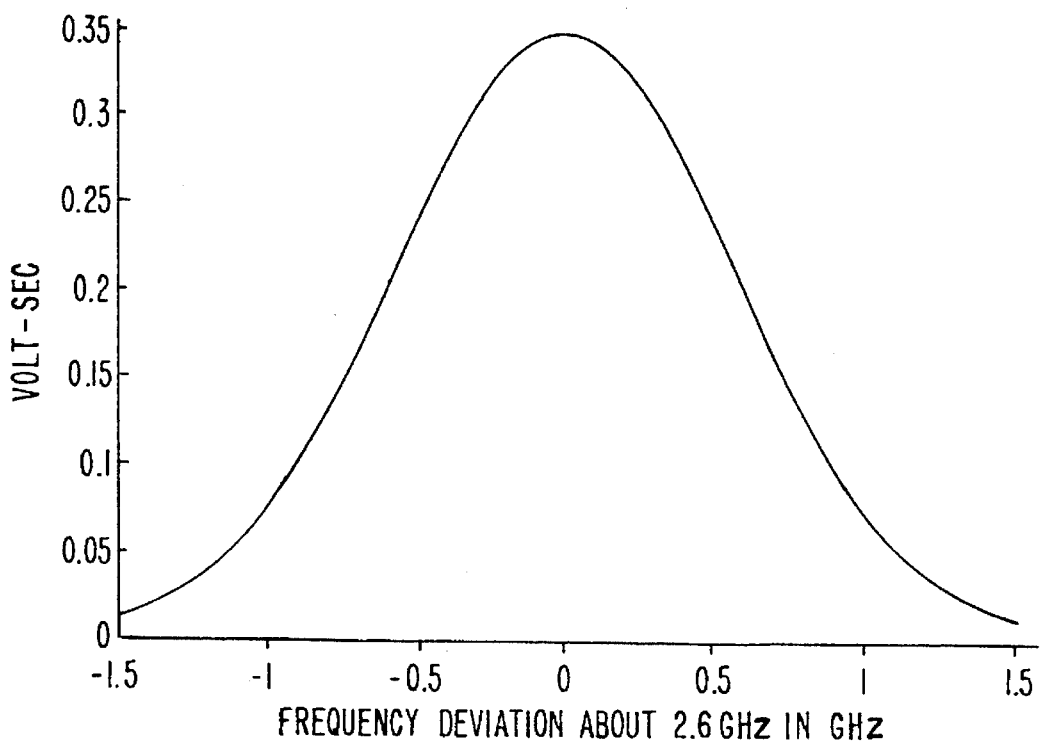
FIG. 5b shows the amplitude spectrum of the single pulse.

Note that the pulses do not have to be contiguous in time or even have a constant amplitude. Consider the Gaussian pulse modulated waveform, p(t), shown in FIG. 3a, as produced by the following source: "Short Pulse Microwave Source with a High PRF and Low Power Drain", G. F. Ross, Richard M. Mara, Kenneth W. Robbins, U.S. Pat. No. 5,216,695. The positive frequency domain portion of the spectrum for this pulse is shown in FIG. 5b. That is:

$$p(t) = \frac{ve^{-a^2}}{zt^2} \cos \omega_o t$$

where
v=1
a=3.593
$\omega_o = 2\pi f_o$
$f_o$=2.6 in GHz $$T_o = \frac{1}{f_o} = .385 \, ns$$

and $$p(t) \overset{f}{\leftrightarrow} P(\omega) =$$

$$\frac{1}{2} \frac{\sqrt{2\pi}}{a} v e^{\frac{-(\omega-\omega_0)^2}{2a^2}} + \frac{1}{2} \frac{\sqrt{2\pi}}{a} v e^{\frac{-(\omega+\omega_o)}{2a^2}}.$$

Figure 6A:
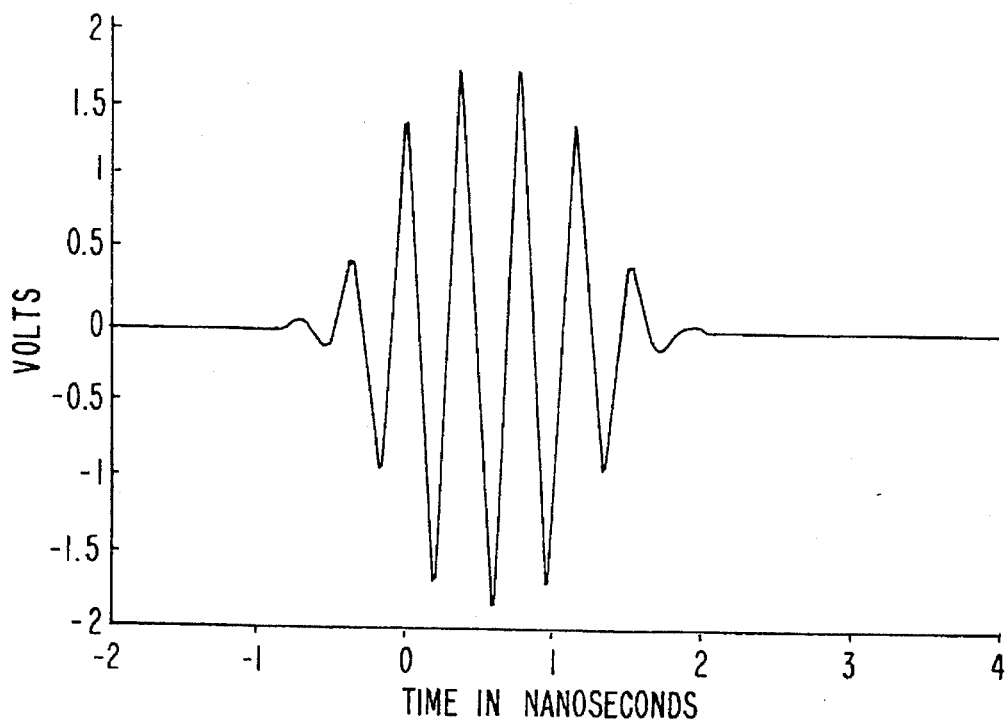
FIG. 6a shows a voltage vs. time graph of the sum of four Gaussian-like UWB pulses spaced one RF period apart.
Figure 6B:
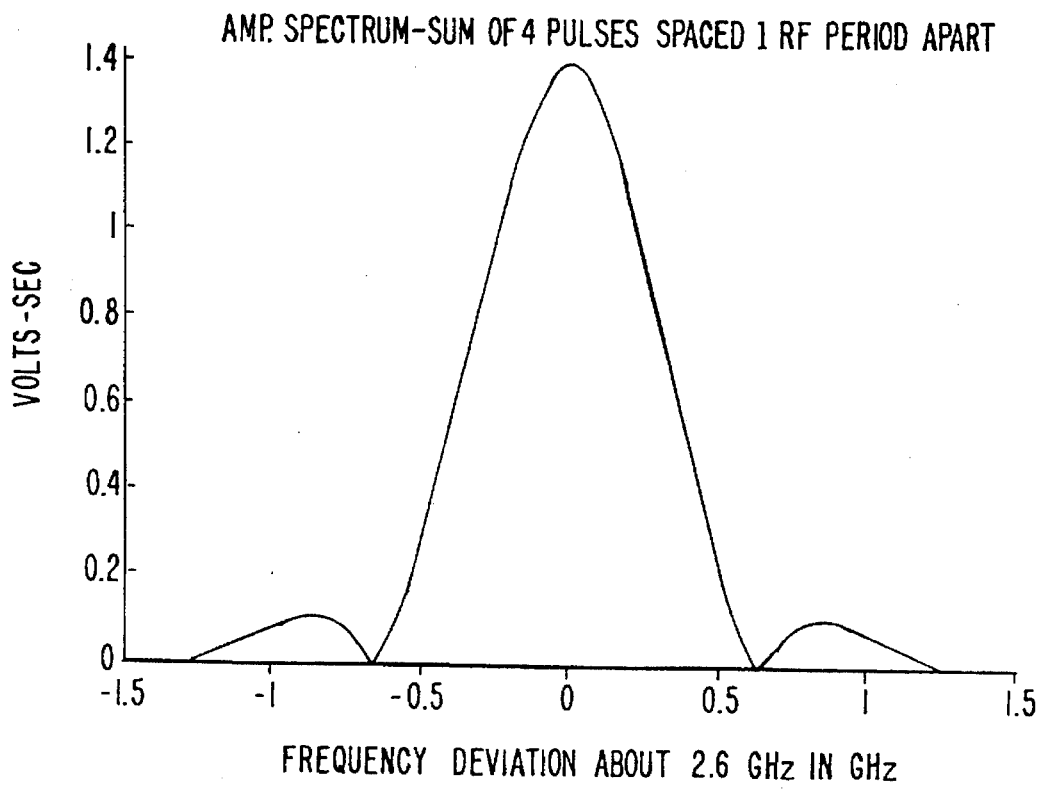

By using N=4 pulses and varying the spacing, the time domain and amplitude spectrums shown in FIGS. 6a and 6b, for example, are produced, where $$P_\Sigma(t) = \sum_{n=0}^{N-1} p(t - n\tau)$$

where
$\tau$=0.385 ns
N=4;

and $$|P_{\Sigma+}(\omega)| = \sqrt{\frac{\pi}{2}} \cdot \frac{v}{a} e^{-(\Delta\omega)^2/2a^2} \frac{\sin N(\omega_o + \Delta\omega)\tau/2}{\sin(\omega_o + \Delta\omega)\tau/2},$$

where
N=4
$\tau$=0.385 ns.

Figure 7A:
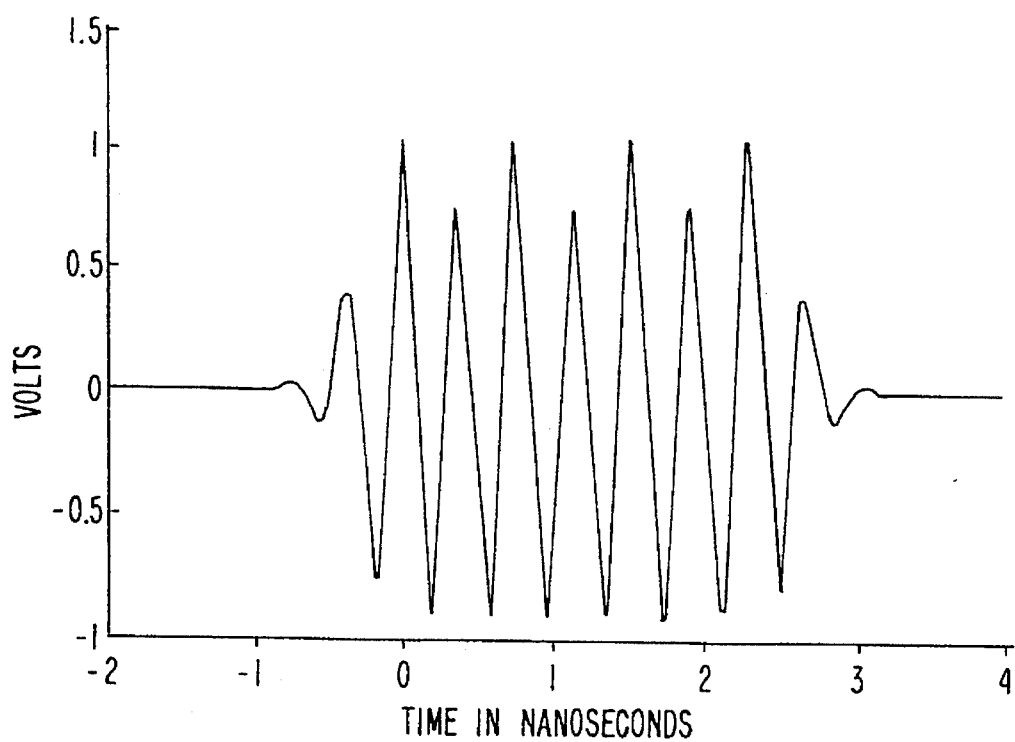
FIG. 7a shows a voltage vs. time graph of the sum of four UWB pulses spaced two RF periods apart.
Figure 8:
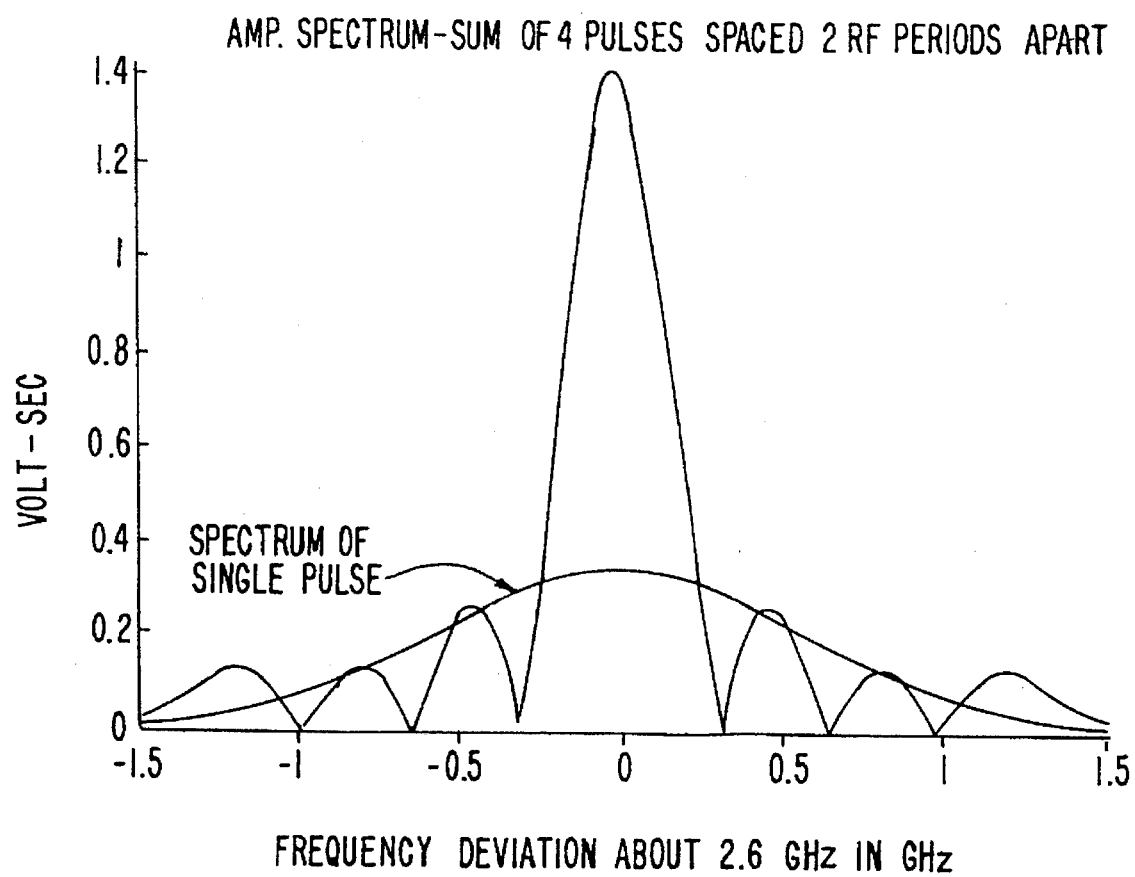
FIG. 8 compares the spectra of FIGS. 5b and 7b.

In each case the radiated energy is increased and the bandwidth decreased by a factor of N at the expense of higher spectral sidelobes. The time and frequency domain responses of 4 pulses separated by 2 RF cycles are shown in FIGS. 7a and b, respectively. Here, $\tau$=0.77 ns. The spectrum for this signal is compared to that of a single Gaussian pulse in FIG. 8. When very short pulse bursts are separated and commensurately spaced in time, the envelope of the waveform is, essentially, sampled. In this case, the spectrum becomes periodic.

The problem then reduces to one of synthesis. Namely, given the acceptable level of sidelobes in the frequency domain, what should be the shape and spacing of the pulses in the time domain? This is a problem that antenna specialists have understood for many years. There, the problem is to define the aperture distribution for a given far field pattern. The problems are exactly analogous because the aperture distribution and far field patterns are Fourier transforms of each other just as the time and frequency domain are related.

To receive the narrower band (and longer duration) signals, one could use a conventional peak detecting receiver. Here, a capacitor can be used to integrate hits. Alternately, a runnel diode superheterodyne scheme, as described in U.S. patent Ser. No. 07/885,300 entitled "Coherent Processing Tunnel Diode UWB Receiver" by G. F. Ross, which has been allowed, can be used. In this invention, the RF pulse burst is converted to a baseband pulse which is efficiently detected by the tunnel diode operated in a constant false alarm rate (CFAR) loop.

Figure 7B:
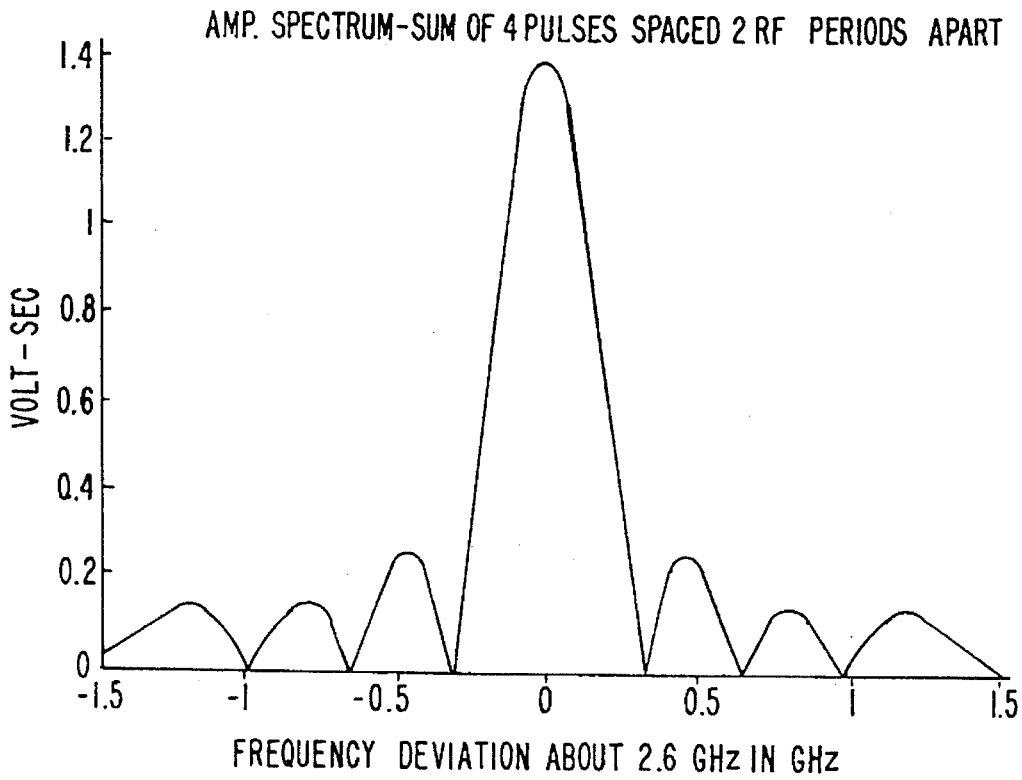

The implementation of the proposed invention is different from that previously used to synchronize active array elements. For example, in U.S. Pat. No. 5,084,706, referenced earlier, all the element sources in the array shown in FIG. 7a are synchronized in time to fire at t=0. This produces an antenna beam at boresight. Note that the elements are spaced, depending on the pulse width of the transmission, to narrow the effective beamwidth while eliminating grating lobes of the array; the greater the element separation, d, the narrower the effective beamwidth. In the subject invention, the spacing between elements is minimized so as to create, effectively, a point source. The signals radiated by each element to produce a broad beam are delayed by one or two RF periods apart as shown in FIGS. 6 and 7, respectively, in the examples. The quadrupole arrangement necessary to produce these waveforms is shown in FIG. 9a.

As further evidence of the efficacy of the subject invention, consider the amplitude spectrum of the Gaussian pulse modulated signal shown in FIG. 5b. The 3 dB bandwidth of this signal is approximately 1 GHz. The signal can be readily centered at 3 GHz by simply retuning the antenna (e.g., reducing somewhat the length of the dipole radiating element). The 6 dB bandwidth of four pulse modulated signals spaced two RF periods apart (FIG. 7b) is approximately 200 MHz. The resulting transmission is then centered at 3 GHz ±100 MHz and is operating in the FCC band designated for Radio Location (coastal radar, tracking systems, etc). The allowed band here is 2.9–3.1 GHz. Now, the peak power propagated by the UWB sources is significantly below the FCC allowed radiation for this frequency band.

Figure 9A:
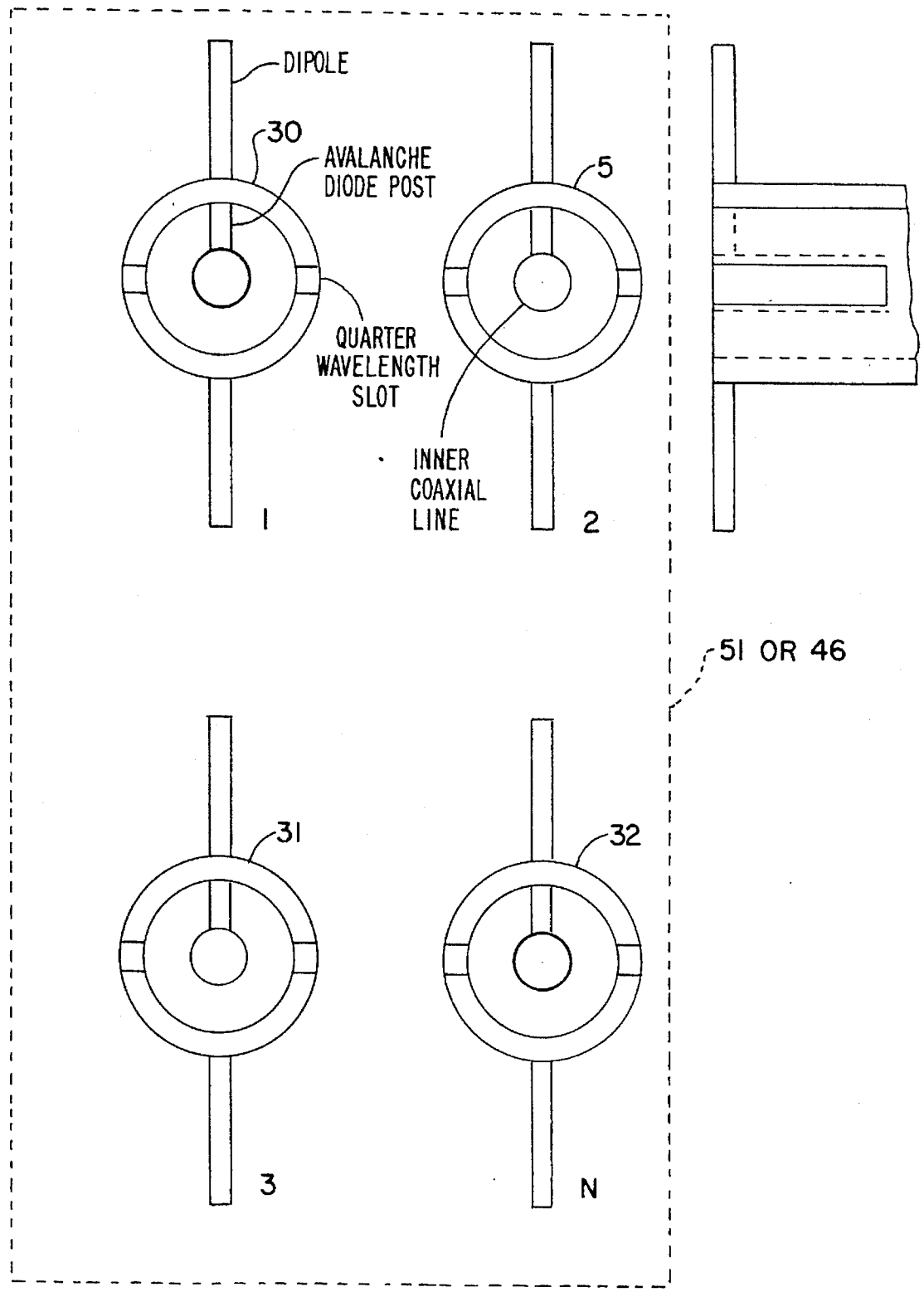
FIG. 9a shows a quadrupole moment of sources (that is, sources in close proximity).
Figure 9B:
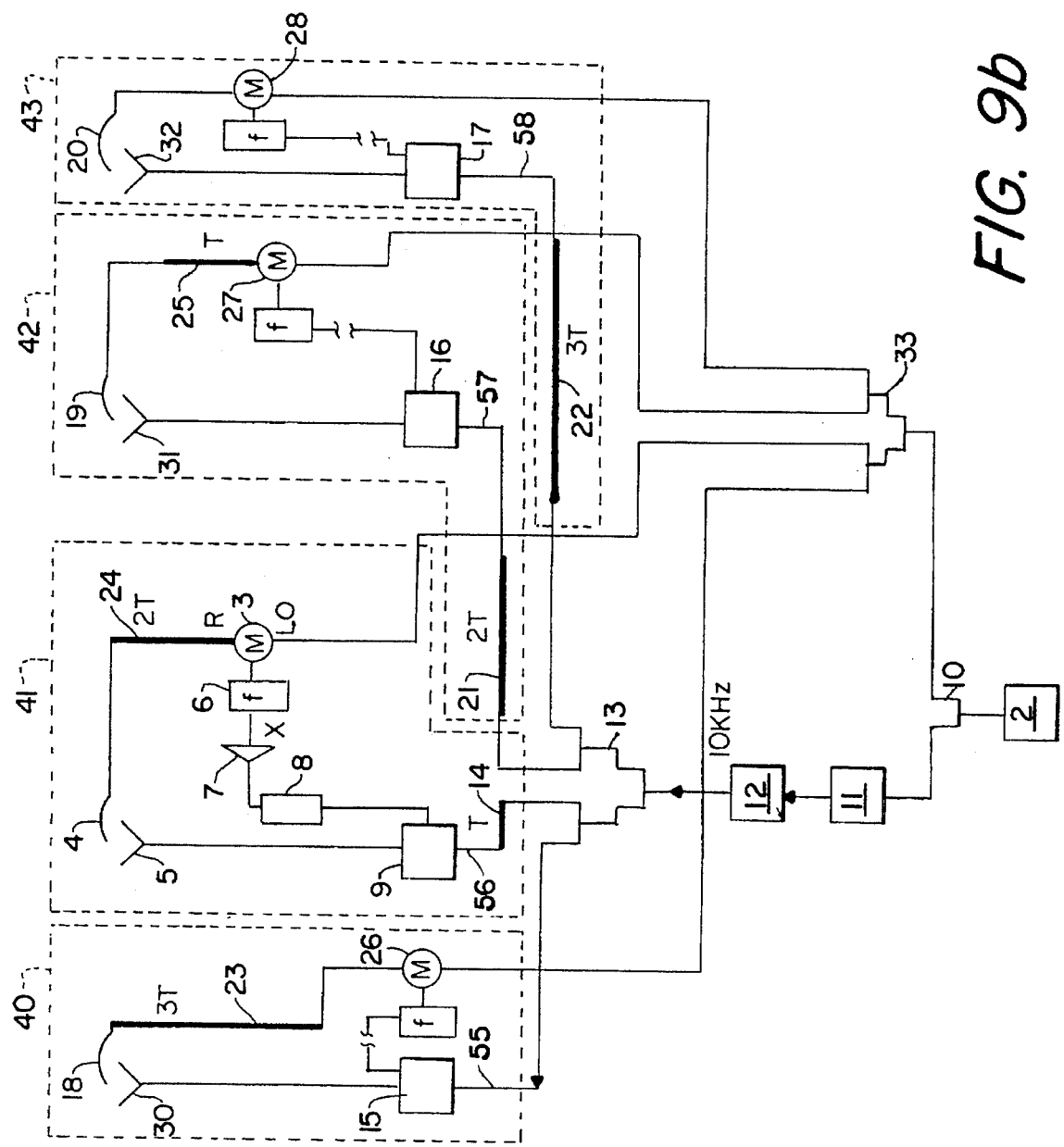
FIG. 9b is a logic diagram of the transmitters.

To achieve the required time delay sequence for narrowing the bandwidth of the quadrupole moment of sources 30, 5, 31 and 32, as shown as antenna array 51 or 46 (FIGS. 1 and 2) in FIG. 9a, consider the closed loop arrangement of transmitter and adjunct circuitry shown in FIG. 9b. Here, certain time delays accomplished by fixed lengths of TEM mode transmission lines are appropriately placed in both the trigger distribution network as well as in the feeds from the antenna pickoff probes which are fed to the mixers.

Figure 10:
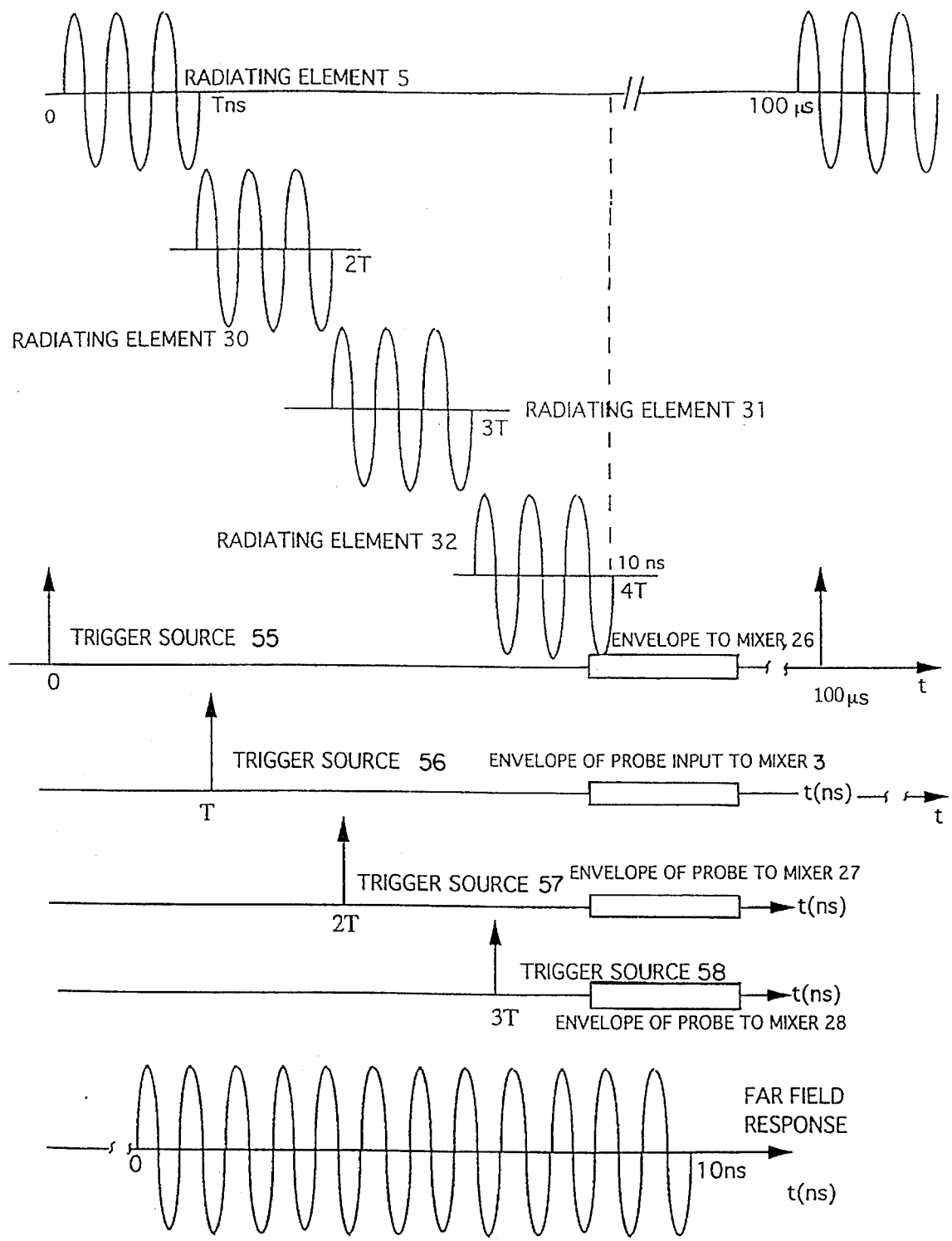
FIG. 10 is a timing diagram for the contiguous locking of individual UWB sources.

The required synchronization of the sources is accomplished in a way similar to that described in referenced U.S. Pat. No. 5,084,706. Here, the beat frequency between a reference microwave cw oscillator and a sample of the transmitted signal must produce a ± baseband pulse. FIG. 9b shows a block diagram of the transmitter configuration of FIG. 9a. FIG. 10 is a timing diagram of the logic sequence of FIG. 9b.

In FIG. 9b, a 2.2 GHz cw reference oscillator 2 is connected to a power divider 10, which is in turn connected to a four-port power divider 33 to provide a 2.2 GHz cw signal to mixers 26, 3, 27, and 28. Oscillator 2 also provides the 2.2 GHz cw signal from power divider 10 to divide-down networks 11 and 12 to provide an approximately 10 KHz square wave to four-port power divider 13, thereby establishing the system prf. Transmitters 40, 41, 42 and 43 are each connected to a port of power dividers 13 and 33.

The synchronization technique of transmitter 41 is illustrated for convenience using a 3-cycle pulse modulated signal of the form $p(t) = \sin \omega_o \{U(t) - U(t-3T)\}$, where $T=2.5$ ns. A 1T (2.5 nanoseconds) delay line 14 is connected between one port of divider 13 and an avalanche transistor Marx Generator 9. This results in antenna 5 radiating a signal at a 2.6 GHz rate for 2.5 nanoseconds every 100 microseconds, i.e., at the system prf. The Marx generator 9, in conjunction with the antenna 5 cavity, is designed in the given example to produce a 3-cycle output signal for 2.5 nanoseconds for a given trigger.

A probe 4 located within radiating element 5 is connected to an R terminal of a mixer 3 through a 2T delay line 24. The 2.2 GHz signal from one port of power divider 33 is applied to an LO terminal of mixer 3. The cw frequency of oscillator 2 is chosen to produce, when mixed in the mixer 3 with a sample of a transmitted pulse packet by the probe 4, exactly one-half cycle of microwave energy (i.e., a +/− baseband or video pulse).

The other beat frequencies at the X output port of the mixer 3 are removed by filter 6. The baseband signal output from filter 6 is amplified by a 0–500 MHz low-cost amplifier 7 and forwarded to a + or − peak detector 8, producing, essentially, a dc voltage which is applied directly to the base-to-emitter junction of the first stage of an avalanche transistor Marx Generator 9. As shown in the referenced patent, the time delay of the source output 9, once excited by a trigger, is, approximately, linearly related to this base-to-emitter voltage. When the signal from probe 4, which is applied to the R terminal of mixer 3, is in phase with the 2.2 GHz signal applied to the LO terminal, then the output of peak detector 8 is a null. Any positive or negative output from peak detector 8, which indicates an out-of-phase condition is applied to the Marx generator 9 to either advance or delay the output signal by an amount proportional to the peak detector 8 output.

The gating of the sources 9, 15, 16, and 17 described in the example requires specific delay lines in both the trigger distribution lines, as well as in series with the signals obtained from pick-off probes 4, 18, 19, 20 located in radiating elements 5, 30, 31 and 32 respectively. The delay lines 23, 24, and 25 at 3T, 2T, and 1T, respectively, result in the mixers 26, 3, 27 and 28 synchronizing each output signal to the 2.2 GHz signal applied to the LO terminal during the 3T time cycle. This assures that the output signals are always contiguous in time and in synchronization with each other at the far field.

Oscillator 2 is typically a Watkins Johnson V801 Voltage Control Oscillator; the mixers 26, 3, 27 and 28 are typically Mini-Circuits ZFM-15 solid state logic elements; and the amplifier 7 is typically a 20 dB Avantek wideband IF amplifier. The Marx Generator 9 is described in U.S. Pat. No. 5,216,695 and the peak detector 8 is described in the referenced U.S. Pat. No. 5,084,706. Antennas 5, 30, 31 and 32 are described in U.S. Pat. No. 5,307,079. All of the remaining components are commercially available.

A timing diagram shown in FIG. 10 depicts the outputs from radiating elements 5, 30, 31, and 32 via sources 9, 15, 16, and 17 and the required trigger delays applied to these sources by delay lines 14, 21, and 22. The required delays provided by lines 23, 24, and 25 and the signals applied to mixers 26, 3, 27, and 28 are also shown to achieve the required sequency for the quadrupole moment of sources. Note that the time delays are in multiples of T, the duration of a single pulse burst in the example (i.e., 3 cycles in 2.5 nanoseconds). Note that the resulting output signal of the quadrupole transmitter configuration of FIG. 9a has a duration of 10 nanoseconds every 100 microseconds.

Although only four sources are illustrated, it is clear that the concept can readily be extended to N sources.

While the invention has been shown and described with reference to the preferred embodiment thereof, it will be understood by those skilled in the art that the above and other changes in form and detail may be made therein without departing from the scope and spirit of the invention.

We claim:

1. A low cost Ultra-Wideband array system for transmitting short pulses having decreased bandwidth and increased radiated energy comprises:

reference means for generating a reference cw signal at a first predetermined frequency and a sequence of trigger signals at a second predetermined frequency;

a plurality of N transmitters in close proximity, each coupled to said reference means, and each of said plurality of N transmitters including:
first delay means for delaying said sequence of trigger signals by a first predetermined duration of for an $n^{th}$ of said plurality of N transmitters;

radiating means coupled to said first delay means and responsive to said delayed sequence of trigger signals for generating an RF signal at a third predetermined frequency of duration T;

probe means coupled to said radiating means for sampling said RF signal;

second delay means coupled to said probe means for delaying said sampled RF signal by a second predetermined duration for said $n^{th}$ of said plurality of N transmitters;

synchronization means coupled to said second delay means and said radiating means for synchronizing said RF signal with said reference cw signal;

said radiating means coupled to said synchronization means for transmitting said synchronized RF signal of duration T; and receiving means coupled to said each of said plurality of N transmitters for receiving in a far field, said short pulse of duration NT made up of N contiguous RF signals.

2. The array system of claim 1 wherein said first predetermined frequency is 2.2 GHz, said second predetermined frequency is 10 KHz, said third predetermined frequency is 2.6 GHz and T equals 2.5 nanoseconds.

3. The array system of claim 2 wherein said first predetermined duration is (n−1)T for said $n^{th}$ of said plurality of N transmitters.

4. The array system of claim 3 wherein said synchronization means of said each of said plurality of N transmitters comprises:

mixer means coupled to said reference means and said second delay means for comparing said sampled RF signal with said reference cw signal and generating a half cycle of microwave energy, wherein said second delay means delays said sampled RF signal by said second predetermined duration of (N−n)T for said $n^{th}$ of said plurality of N transmitters;

filter means for removing other beat frequencies from said half cycle of microwave energy and generating a baseband signal;

amplifier means for amplifying said baseband signal; and peak detector means for receiving said amplified baseband signal and generating a D.C. voltage having a ± value proportional to the difference in beat frequency between said reference cw signal and said sampled RF signal.

5. The array system of claim 4 wherein said radiating means of said each of said plurality of N transmitters comprises:

generator means responsive to said delayed sequence of trigger signals for initially generating said RF signal, said generator means being further responsive to said D.C. voltage for adjusting said RF signal until said D.C. voltage is a null.

6. The array system of claim 5 wherein said receiving means comprises: a target for reflecting said short pulses; and a radar receiver for detecting said reflected short pulses.

7. The array system of claim 5 wherein said receiving means comprises:

a CFAR communication receiver for receiving said short pulses.

8. A low cost Ultra-Wideband array system for transmitting short pulses having decreased bandwidth and increased radiated energy comprises:

a plurality of N transmitters in close proximity, each having radiating means for transmitting an RF signal of duration T;

reference means for generating a cw reference signal at a first predetermined frequency and a plurality of cyclic signals at a second predetermined frequency, said plurality of cyclic signals and said cw reference signal synchronously related to each other;

each of said plurality of N transmitters including, first delay means of delaying said plurality of cyclic signals a first predetermined duration for an nth Of said plurality of N transmitters;

synchronization means coupled to said reference means and said radiating means for synchronizing said RF signal with said reference cw signal, said synchronization means including means for sampling said RF signal and second means for delaying said sampled RF signal for a second predetermined duration;

receiving means coupled to said each of said plurality of N transmitters for receiving, in a far field, said short pulse of duration NT made up of N contiguous RF signals.

9. The array system of claim 8 wherein said first predetermined frequency is 2.2 GHz, said second predetermined frequency is 10 KHz and T equals 2.5 nanoseconds.

10. The array system of claim 9 wherein said first predetermined duration is (n−1)T for said $n^{th}$ of said plurality of N transmitters.

11. The array system of claim 10 wherein said synchronization means of said each of said plurality of N transmitters comprises:

said sampling means coupled to said radiating means for sampling said RF signal;

said second delay means coupled to said sampling means for delaying said sampled RF signal by said second predetermined duration of (N−n)T for said $n^{th}$ of said plurality of N transmitters;

mixer means coupled to said reference means and said second delay means for comparing said sampled RF signal with said reference cw signal and generating a half cycle pulse having an amplitude proportional to a difference in beat frequency between said sampled RF signal and said reference cw signal.

12. The array system of claim 11 wherein said radiating means of said each of said plurality of N transmitters comprises:

generator means responsive to said delayed cyclic signals for initially generating said RF signal, said generator means being further responsive to said half cycle pulse for adjusting said RF signal until said half cycle pulse is a null.

13. The array system of claim 12 wherein said receiving means comprises:

a target for reflecting said short pulses; and a radar receiver for detecting said reflected short pulses.

14. The array system of claim 12 wherein said receiving means comprises:

a CFAR communication receiver for receiving said short pulses.

* * * * *